(No Model.)
E. L. SHULTZ.
BEARING BRACKET FOR BICYCLES.
No. 571,289. Patented Nov. 10, 1896.
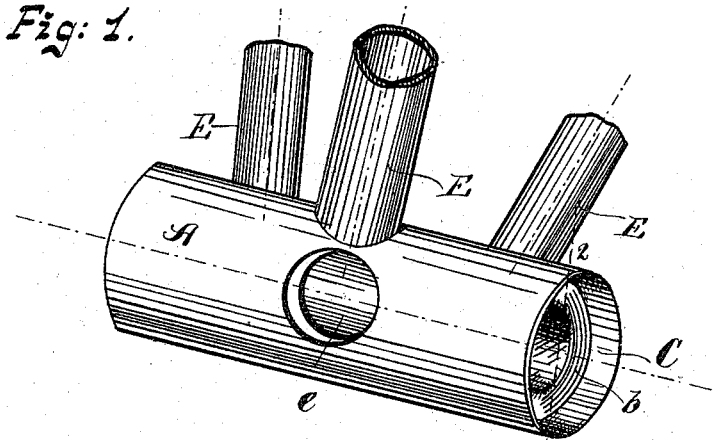
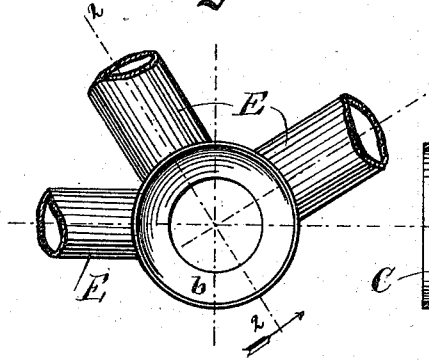
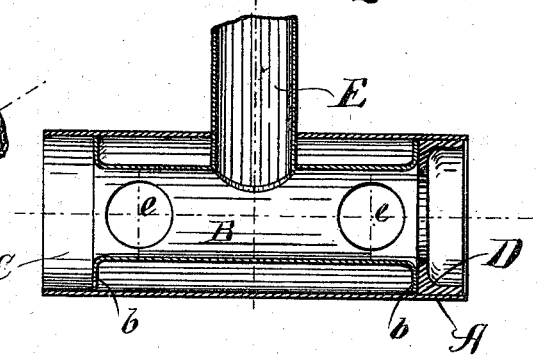
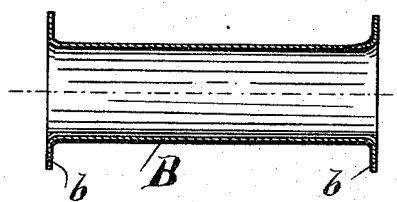
Witnesses.         Inventor.
Thos. F. Sheridan      Edward L. Shultz
Samuel E. Hibben   By Banning and Banning and Payson
                    Attorneys
THE NORRIS PETERS CO., PHOTO-LITHO., WASHINGTON, D. C.

UNITED STATES PATENT OFFICE.

EDWARD L. SHULTZ, OF CHICAGO, ILLINOIS.

BEARING-BRACKET FOR BICYCLES.

SPECIFICATION forming part of Letters Patent No. 571,289, dated November 10, 1896.

Application filed July 15, 1893. Serial No. 480,626. (No model.)

*To all whom it may concern:*

Be it known that I, EDWARD L. SHULTZ, a citizen of Poland, residing at Chicago, Illinois, have invented certain new and useful Improvements in Bearing-Brackets for Bicycles, of which the following is a specification.

The object of my invention is to provide a simple, light, and durable bearing-bracket for supporting either the crank-shaft or the steering-head; and it consists in the details of construction and arrangement hereinafter described and claimed.

In the drawings, Figure 1 is a perspective view of my improved bearing-bracket with a portion of the brace-rods for the frame of a bicycle attached; Fig. 2, a sectional elevation of the same, taken on the line 2 of Figs. 1 and 3, looking in the direction of the arrows; Fig. 3, an end elevation of Fig. 2, and Figs. 4 and 5 sectional details of the parts of the bracket proper.

I have illustrated my improvement preferably as forming a portion of and entering into the construction of a bicycle; but it will be understood that I do not desire to limit myself to this application of my improvement, as I desire to use it in connection with other structures.

In the construction of bicycles it is well known that the greatest strength, consistent with the least amount of material and lightness, is demanded in modern structures, as well as a simple, economical, and efficient method of securing the different portions together. To attain these objects and to furnish a simple, light, and durable bracket, as well as an economical method of joining the brace-rods and brackets together, I make a tube A, of the desired shape and size, which forms the external casing or shell for the bracket. Within this tube I insert a second tube B, provided with flanges *b* at its ends, of a diameter to fit snugly the interior diameter of the shell of the casing A. The second tube is inserted centrally within the outer shell in such manner as to leave spaces C at each end, into which may be inserted a bearing-case D, (particularly shown in Fig. 2,) and adapted to be used in connection with the usual ball-bearings; but as the ball-bearings and their method of attaching the same form no portion of this invention I will not enter into a detailed description of the same, but will merely say that any usual method of attaching them to the bearing-brackets may be used in connection with my improvement. When the inner tube is inserted in position within the outer shell, both tubes and shells may be firmly brazed or soldered together in order to insure the necessary rigidity and connection between the parts.

To attach the brace-rods E to the bearing-bracket, I drill holes *e* through both the outer and inner tubes, through which the brace-rods are inserted, so as to have a bearing in connection with both tubes. This affords a sufficient length of bearing with a minimum amount of connection—that is, there are two bearings for the brace-rods, one in the inner tube and the other in the outer tube, between which there is a space of probably three-eighths of an inch. The rods may be brazed or soldered to the operating-bracket, so as to insure the necessary rigid connection between the same.

From the foregoing it will be seen that I have provided a simple, light, and durable bearing-bracket, as well as an economical method of attaching and connecting the brace-rods with the same, which does away with the expensive operations of boring out drop forgings or castings in order to make an efficient bearing-bracket.

I claim—

1. In mechanism of the class described, the combination with a crank-hanger tube of tubular frame members inserted through the sides of said tube, and united in the central portion thereof, substantially as described.

2. In mechanism of the class described, the combination of a main tube, a supplemental tube disposed longitudinally within said main tube, and a frame member inserted through the sides of the main tube and fastened to the supplemental tube, substantially as described.

3. In mechanism of the class described, the combination of an outer cylindrical tube, an inner tube supported concentrically within the outer tube and rigidly connected to it, and brace-rods having a bearing in each tube and firmly secured to either tube, substantially as described.

4. In mechanism of the class described, the combination of an outer cylindrical tube, an inner tube supported concentrically within the outer tube and firmly secured thereto, both tubes being provided with openings, and a brace rod or rods inserted therein and firmly secured to either tube, substantially as described.

EDWARD L. SHULTZ.

Witnesses:
   THOMAS F. SHERIDAN,
   ANNIE C. COURTENAY.